Aug. 26, 1952 L. C. WALES 2,608,663
MULTISTAGE TURBOGENERATOR
Filed Sept. 8, 1951 2 SHEETS—SHEET 1
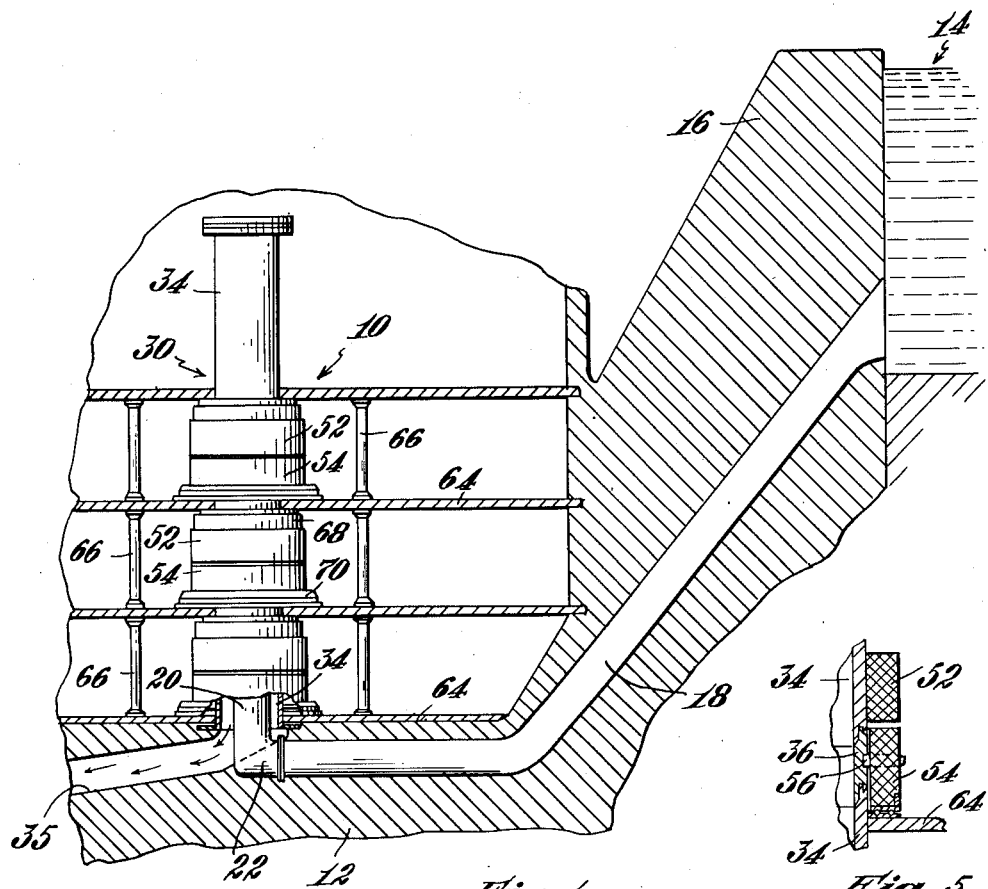
Fig. 1
Fig. 5
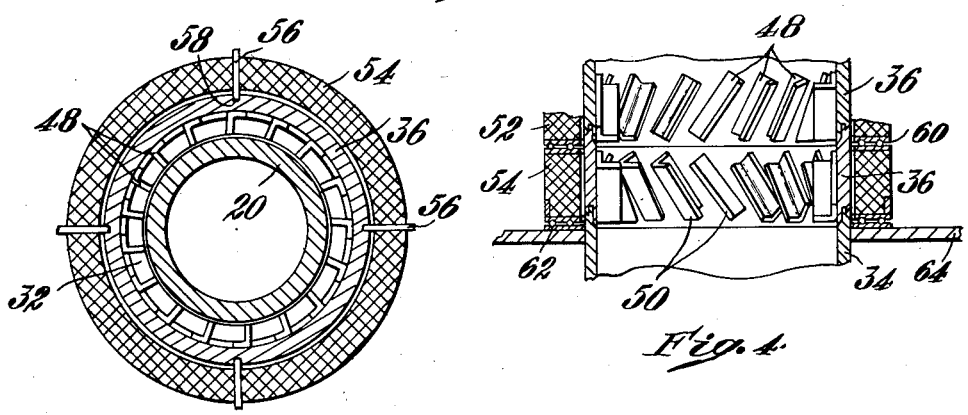
Fig. 3
Fig. 4
Inventor
Lester C. Wales
by Roberts, Cushman & Grover
Att'ys

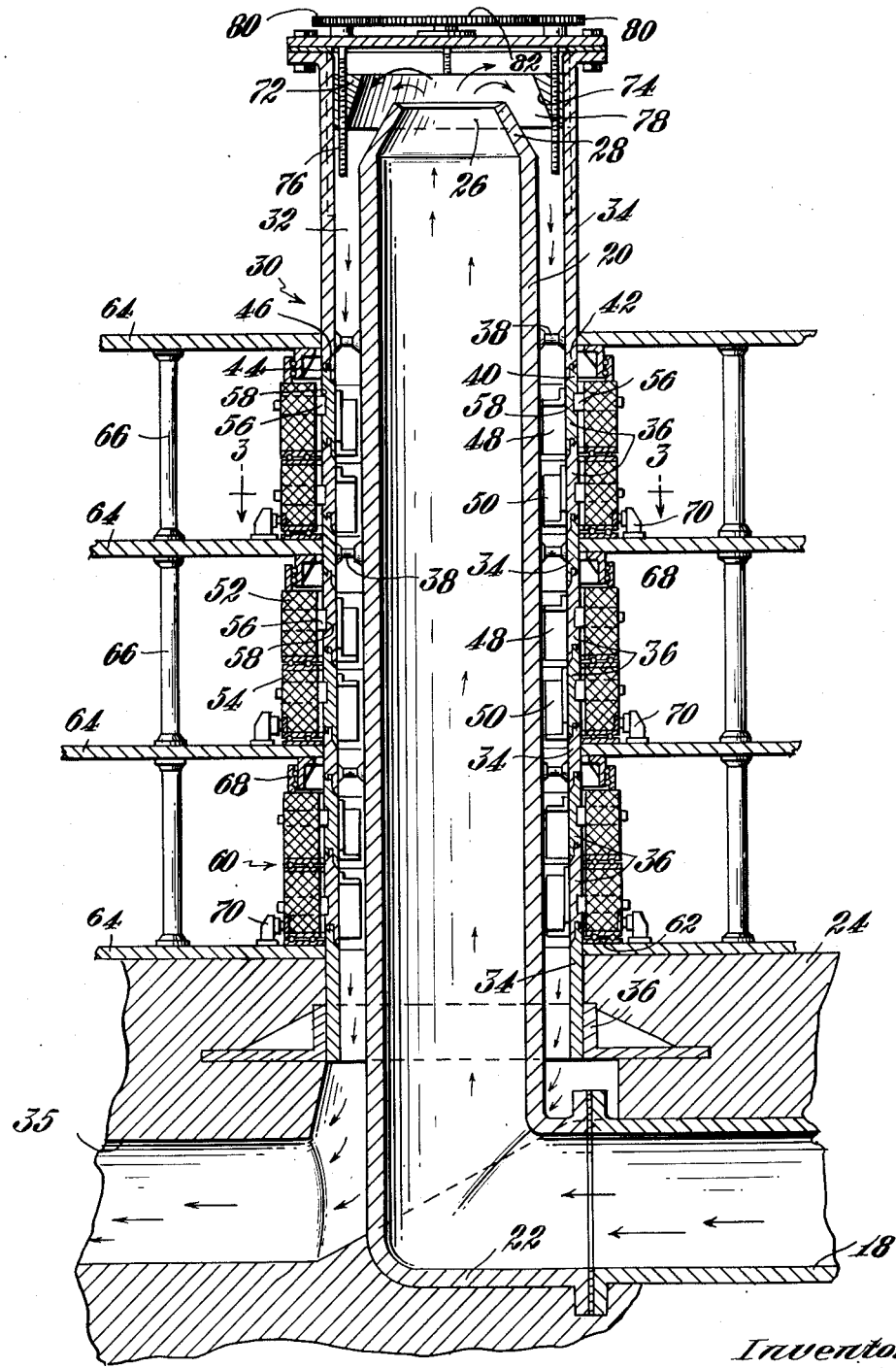

Patented Aug. 26, 1952

2,608,663

UNITED STATES PATENT OFFICE 2,608,663

MULTISTAGE TURBOGENERATOR

Lester C. Wales, Winthrop, Maine

Application September 8, 1951, Serial No. 245,741

12 Claims. (Cl. 290—52)

This invention relates to turbo generators and has for its principal objects to provide a compact unit which may be placed adjacent to a source of water supply, such as a reservoir at a level below the supply so that advantage of natural gravitation of the water to the turbine may be availed of, in which the construction is simplified so that the moving parts are carried by a column-like support and in which one or more generating units are employed, one or all of which are selectively operatable to generate current.

As herein illustrated, a stand pipe is located at a place well below the level of the available supply of water so that its upper open end is at a level below that of the surface of the supply. The lower end of the stand pipe is connected to or near the bottom of the supply so that water gravitates from the supply into the stand pipe and overflows its upper end. A casing surrounds the stand pipe and is concentric therewith, forming with the casing an annular passage through which the water gravitates to the lower end of the stand pipe and is discharged. The casing has movable sections, intermediate its ends, rotatable about the vertical axis of the stand pipe and blades are fastened to the movable sections so as to project into the annular space in the path of the descending water and hence to effect rotation of the movable sections. The movable sections are preferably interposed in spaces between fixed sections of the casing and in pairs. The blades on a pair of movable sections are disposed in opposite directions so that the sections of each pair rotate counter to each other. Generator elements, that is a field and rotor coil are placed about the casing and there is means for selectively coupling the generator parts to the rotating sections for rotation therewith when current is to be generated and for uncoupling one or more of the elements without interference with other generator elements or with the continuous rotation of the turbine parts. In an alternative form single rotatable sections may be located between adjacent fixed sections to which a generator part may be coupled and the companion part may be fixed to the fixed section of the casing.

The invention will now be described in greater detail with reference to the accompanying drawings wherein:

Fig. 1 is an elevation of a turbo generator of three-stage type shown at the base of a supply of water with connections from the supply to the base of the turbine;

Fig. 2 is a vertical section through the turbo generator to larger scale;

Fig. 3 is a transverse section taken on the line 3—3 of Fig. 2;

Fig. 4 is a fragmentary vertical section taken on the line 4—4 of Fig. 2; and

Fig. 5 is a fragmentary vertical section of an alternative construction in which only one part of the generator unit is rotated.

Referring to the drawings (Fig. 1) a three-stage turbo generator 10 is shown as being located at the base 12 of a water supply 14, for example a reservoir, which is dammed at 16. A conduit or penstock 18 brings water gravitationally from the lower part of the reservoir to the lower end of the turbo generator where it is connected to a vertically arranged stand pipe 20, the lower end of which has an elbow for connection to the penstock. The stand pipe 20 (Fig. 2) in effect, forms a continuation of the penstock and as will appear hereinafter also forms the main support for the turbo generator parts. The lower end of the stand pipe is embedded in a concrete base or foundation 24 and its upper end is open as shown at 26 and has an inwardly inclined lip 28. A casing 30 surrounds the stand pipe being concentric therewith and provides therewith an annular space 32 extending from the top of the stand pipe to the lower end through which water rising through the stand pipe and spilling over the upper end may gravitate to the lower end of the stand pipe and be discharged through a conduit 35 in the concrete base.

The casing 30 is comprised of fixed and movable sections 34 and 36 respectively. The fixed sections 34 are made fast to the stand pipe by means of tie bolts 38 spaced circumferentially of the stand pipe at such intervals as not to interfere with free flow of the water through the annular space. The movable sections in the preferred form of the invention are interposed in pairs between fixed sections and have inclined or beveled edges 40 mating with beveled edges 42 of the fixed sections and with each other. Fins 44 on the beveled edges engage with grooves 46 in the fixed sections to prevent displacement of the sections and to permit rotation of the sections about the stand pipe. The abutting edges of the movable sections having cooperating fins and grooves. Blades 48 are fastened to the inner sides of the movable sections so as to project into the annular space 32 in the path of the descending water and so as to be acted upon by the water and hence to effect rotation of the sections relative to the stand pipe. The blades on one section of each pair are inclined opposite to the blades on the other section of each pair so that the sections rotate counter to each other. Surrounding the movable sections are generator parts consisting of a field coil 52 and a rotor 54. The field coil and rotor are free to turn about the movable sections and may be coupled thereto for rotation with the movable sections by means of keys 56 engageable with slots 58 in the movable sections. By coupling the generator parts with the counter-rotating sections, the generator parts may be made to rotate in opposite directions and hence to generate the desired current.

It is plain by this construction that one or more generator units may be coupled for operation at any given time depending upon the amount of current called for and when the maximum current is not in demand one or more of the generator units may be disconnected without affecting other generator units and without affecting continued rotation of the turbine.

The generator parts 50 and 54 (Figs. 2 and 4) are supported for rotation on each other and on a series of vertically spaced floors. As illustrated, annular bearings 60 are placed between each pair of generator parts so that the upper part rests on and is free to turn on the lower part. Annular bearings 62 support the lower bearing parts on a horizontally disposed floor 64 which rests on the base 24 and similar bearings 62 support the lower generator parts of the successive generator units on the floor members 64 elevated above the lower-most floor by successive columns 66. The upper generator element of each generator unit is afforded additional support from the underside of the floor 64 next above it by a bearing element 68. Bearing members 70 are located adjacent the periphery of the lower parts 54 and provide for preventing radial movement of the parts.

An alternative construction is illustrated in Fig. 5, wherein one of the generator parts is fixed and the other is rotatable. In this construction the casing has spaced fixed sections 34 between which are single rotatable sections 36. One of the generator parts is fixed to the fixed section and the other is placed about the movable section and may be coupled therewith by a key in the same manner as described above. As thus constructed, one part of the generator is always stationary while the other part may be caused to rotate by coupling it to the rotatable section or allowed to remain idle by uncoupling it from the rotatable section. In the alternative construction movable sections are supported for rotation by bearings 62 in the same manner as described above.

The amount of water delivered from the top of the stand pipe and hence the speed of rotation of the movable section of the casing is controlled by a collar or gate 72 located at the top of the casing which has an inclined inner surface 74 corresponding substantially to the inclination of the lip 28, the gate being movable vertically in the casing, so as to change the size of the annular space 78 between them. To this end three or more screws 76 are threaded through the gate and through the top of the casing and have on them gears 80 which mesh with a centrally located gear 82. Rotation of the central gear 82 in one direction or the other will raise or lower the gate and hence vary the opening.

It will be observed that the foregoing construction is such that one or more generator units may be operated at any given time and that by changing the vertical dimensions of the apparatus, the turbo generator may have only a single generator unit or as many more generator units as desired depending, of course, somewhat upon the amount of available vertical space between the bottom of the source of water supply and the lowest point at which the stand pipe may conveniently be located.

It is also apparent that the turbo generator may be operated continuously without generation of any current by disconnecting the generator elements from the rotating parts of the casing or that one or more of the generator units may be operated at any given time depending upon the amount of current called for.

It should be understood that the present disclosure is for the purpose of illustration only and that this invention includes all modifications and equivalents which fall within the scope of the appended claims.

I claim:

1. A turbo generator comprising a stand pipe having an open upper end, said upper end being situated below the level of a source of water supply, means connecting the lower end of the stand pipe to the source of water supply so that water gravitates from the source to the stand pipe and flows out of the upper end thereof, a casing concentric with the stand pipe forming with it an annular passage extending from top to bottom of the stand pipe, rotatable sections associated with the casing, blades attached to the rotatable sections projecting into the annular passage in positions to be acted upon by water gravitating through the passage from top to bottom of the stand pipe and generator elements associated with the rotating sections and movable therewith for generating current.

2. A turbo generator comprising a stand pipe having an open upper end, said upper end being situated below the level of a source of water supply, means connecting the lower end of the stand pipe to the source of water supply so that water gravitates from the source to the stand pipe and flows out of the upper end thereof, a casing concentric with the stand pipe forming with it an annular passage extending from top to bottom of the stand pipe, rotatable sections associated with the casing, oppositely inclined blades attached to adjacent rotatable sections projecting into the annular passage in positions to be acted upon by water gravitating through the passage for effecting counter-rotation of the sections and generator elements associable with the adjacent rotating sections and movable in counter-rotation for generating current.

3. A turbo generator comprising a stand pipe having an open upper end, said upper end being situated below the level of the source of water supply, means connecting the lower end of the stand pipe to the source of water supply so that water gravitates from the source to the stand pipe and flows out of the upper end thereof, a casing concentric with the stand pipe forming with it an annular passage extending from top to bottom, a plurality of pairs of rotatable sections intermediate the ends of the casing, blades attached to said sections projecting into the annular passage in positions to be acted upon by water gravitating through the passage, any given pair of sections having blades of opposite inclination so that they rotate in opposite directions and generator elements associable with each pair of rotatable sections and movable therewith in counter-rotation for generating current.

4. A turbo generator comprising a stand pipe having an open upper end, said upper end being situated below the level of the source of water supply, means connecting the lower end of the stand pipe to the source of water supply so that water gravitates from the source to the stand pipe and flows out of the upper end thereof, a casing concentric with the stand pipe forming with it an annular passage extending from top to bottom of the stand pipe, said casing having fixed sections and movable sections, blades on the movable section projecting into the annular passage in positions to be acted upon by water gravitating through the passage for effecting rotation of the movable sections relative to the fixed sections, generator parts associated with the casing for generating current by relative movement of the parts and means for making at least one part of a pair of the generator parts fast to a movable section.

5. A turbo generator comprising a stand pipe having an open upper end, said upper end being situated below the level of the source of water supply, means connecting the lower end of the stand pipe to the source of water supply so that water gravitates from the source to the stand pipe and flows out of the upper end thereof, a casing concentric with the stand pipe forming with it an annular passage extending from top to bottom of the stand pipe, said casing having fixed sections and movable sections, blades on the movable sections projecting into the annular passage in positions to be acted upon by water gravitating through the passage for effecting rotation of the movable section relative to the fixed section, generator parts associated with the casing for generating current by relative movement of the parts, one of the generator parts being fixed to a fixed section of the casing and means for fixing the companion part to a movable section.

6. A turbo generator comprising a stand pipe having an open upper end, said upper end being situated below the level of the source of water supply, means connecting the lower end of the stand pipe to the source of water supply so that water gravitates from the source to the stand pipe and flows out of the upper end thereof, a casing concentric with the stand pipe forming with it an annular passage extending from top to bottom, said casing having vertically spaced fixed sections and pairs of movable sections situated in the spaces between the adjacent fixed sections, oppositely inclined blades fixed to each pair of movable sections projecting into the passage in positions to be acted upon by the water for effecting counter-rotation of the movable sections, and field and rotor elements associable with each pair of movable sections for generating current.

7. A turbo generator comprising a stand pipe having an open upper end, said upper end being situated below the level of the source of water supply, means connecting the lower end of the stand pipe to the source of water supply so that water gravitates from the source to the stand pipe and flows out of the upper end thereof, a casing concentric with the stand pipe forming with it an annular passage extending from top to bottom, said casing having vertically spaced sections fixed to the stand pipe, pairs of movable sections located in the spaces between each pair of adjacent fixed sections, means supporting said movable sections for rotation about the stand pipe, oppositely inclined blades on each pair of movable sections projecting into the passage in positions to be acted upon by the water for effecting counter-rotation of the movable sections, and generator parts associable to each pair of movable sections for generating current.

8. A turbo generator according to claim 1 wherein the generator parts are concentric with the rotatable sections and there is means releasably connecting the generator parts to the rotatable sections.

9. A turbo generator according to claim 1 wherein the generator parts surround the rotatable sections and there are interlockable elements on the rotatable sections and the generator parts for connecting the generator parts to the rotatable sections for rotation therewith and means for holding the interlockable elements disengaged.

10. A turbo generator according to claim 1 wherein a gate is located at the upper end of the stand pipe for controlling the discharge of water from the open end of the pipe to the annular space between it and the casing.

11. A turbo generator according to claim 1 wherein an annular gate is mounted within the casing above the stand pipe and concentric therewith, said gate having a cross-section of such shape as to close the annular space between the upper end of the pipe and the casing when lowered into engagement with the pipe and means for effecting vertical movement of the gate to vary the size of the opening.

12. A turbo generator according to claim 1 wherein the upper end of the stand pipe has an inwardly inclined lip, an annular gate is mounted within the casing above the stand pipe and concentric therewith, said gate having an inclined portion cooperable with the inclined lip of the stand pipe completely to close the annular space between the pipe and casing upon bringing the gate into engagement with the pipe and means for raising and lowering the gate to vary the annular opening.

LESTER C. WALES.

REFERENCES CITED

The following references are of record in the file of this patent:

UNITED STATES PATENTS

| Number | Name | Date |
|---|---|---|
| 760,035 | Stumpf | May 17, 1904 |
| 791,414 | Gordon | May 30, 1905 |
| 791,415 | Gordon | May 30, 1905 |
| 958,681 | Schulz | May 17, 1910 |
| 1,216,162 | Pratt | Feb. 13, 1917 |